United States Patent
Wang et al.

(10) Patent No.: US 9,223,344 B2
(45) Date of Patent: Dec. 29, 2015

(54) DOCKING STATION

(71) Applicant: PEGATRON CORPORATION, Taipei (TW)

(72) Inventors: Chi-Han Wang, Taipei (TW); Chun-Liang Yeh, Taipei (TW); Hua-Yu Huang, Taipei (TW); Mei-Hui Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 269 days.

(21) Appl. No.: 13/725,828

(22) Filed: Dec. 21, 2012

(65) Prior Publication Data

US 2013/0163187 A1      Jun. 27, 2013

(30) Foreign Application Priority Data

Dec. 23, 2011    (TW) .............................. 100148398 A (51) Int. Cl.
   *G06F 1/16*         (2006.01)

(52) U.S. Cl.
   CPC ............ *G06F 1/1632* (2013.01); *G06F 1/1654* (2013.01); *G06F 1/1669* (2013.01)

(58) Field of Classification Search
   CPC ..... G06F 1/1632; G06F 1/1626; G06F 1/263; G06F 1/1669; G06F 1/1654; G06F 1/266; G06F 1/24; G06F 1/16; G06F 1/1613; G06F 1/1635; G06F 1/1684; G06F 1/169; G06F 1/1694; G06F 1/189; G06F 1/3203; G06F 3/02; G06F 9/4411; H05K 7/02; H05K 7/00

USPC ............ 361/679.41, 679.01, 679.02, 679.21, 361/679.26, 679.27, 679.29; 248/917–924; 710/303–305
See application file for complete search history.

(56) References Cited

U.S. PATENT DOCUMENTS

| | | | |
|---|---|---|---|
| 6,593,859 B1 | 7/2003 | Watanabe | |
| 7,663,602 B2 * | 2/2010 | Jones et al. | 345/168 |
| 8,624,844 B2 * | 1/2014 | Behar et al. | 345/169 |
| 8,717,319 B2 * | 5/2014 | Wu | 345/173 |
| 2003/0210513 A1 * | 11/2003 | Yen et al. | 361/681 |
| 2004/0005184 A1 | 1/2004 | Kim et al. | |
| 2005/0231485 A1 | 10/2005 | Jones et al. | |
| 2011/0292584 A1 * | 12/2011 | Hung et al. | 361/679.26 |
| 2012/0176746 A1 * | 7/2012 | Chen et al. | 361/679.55 |

FOREIGN PATENT DOCUMENTS

| | | |
|---|---|---|
| CN | 1195801 A | 10/1998 |
| CN | 1467615 A | 1/2004 |
| CN | 1591331 A | 3/2005 |

(Continued)

*Primary Examiner* — Anthony Haughton
*Assistant Examiner* — Ingrid Wright
(74) *Attorney, Agent, or Firm* — Muncy, Geissler, Olds & Lowe, P.C.

(57) ABSTRACT

A docking station is used to hold an electronic apparatus and includes a docking body and a hinge module. The docking body includes an operation interface and a hinge portion. The hinge module includes a hinge element and a holding element. The hinge element is pivotally connected to the hinge portion and connected to the holding element. The holding element and the docking body form a groove. The holding element for holding the electronic apparatus is rotatable relative to the docking body for more than 270 degrees through the rotation space provided by the groove until being stopped by the docking body.

9 Claims, 7 Drawing Sheets

(56) References Cited

FOREIGN PATENT DOCUMENTS

| | | |
|---|---|---|
| CN | 1862444 A | 11/2006 |
| CN | 102012724 A | 4/2011 |
| CN | 201974728 U | 9/2011 |
| CN | 102262422 A | 11/2011 |
| TW | 200623792 A | 7/2006 |
| TW | M309133 U | 4/2007 |
| TW | 201104391 A | 2/2011 |

* cited by examiner

DOCKING STATION

CROSS REFERENCE TO RELATED APPLICATIONS

This Non-provisional application claims priority under 35 U.S.C. §119(a) on Patent Application No(s). 100148398 filed in Taiwan, Republic of China on Dec. 23, 2011, the entire contents of which are hereby incorporated by reference.

BACKGROUND

1. Technology Field

The disclosure relates to a docking station and, in particular, to a docking station that cooperates with an electronic apparatus.

2. Related Art

With the improved electronic technology, various consumer electronic products (such as a notebook computer, a portable player, a portable game machine, a PDA, an electronic dictionary, or a cell phone) are developed towards the trend of the miniaturization so that the user can easily carry and use them anytime. Besides, for reducing the storage space, a hinge structure is often applied to the electronic apparatus so that the display panel can rotate relative to the host to achieve the fold.

Take the notebook as an example, it mainly includes a main body and a display connected to the main body through a hinge structure. Accordingly, when the notebook is folded and carried, the display covers the main body. When the user wants to use the notebook, the display is rotated for about 120 degrees relative to the main body through the hinge structure, and then the user can operate the notebook for typewriting and moving the cursor for example.

Although the conventional notebook is configured with a hinge structure, the largest rotation angle between the display and the main body is just about 180 degrees, so that the related application and operation are greatly limited.

SUMMARY OF THE INVENTION

An objective of the disclosure is to provide a docking station that can have more applications, enhance the operational stability of the electronic apparatus that is connected to the docking station, and provide more space for operating the electronic apparatus.

To achieve the above objective, a docking station of the disclosure is used to hold an electronic apparatus and includes a docking body and a hinge module. The docking body includes an operation interface and a hinge portion. The hinge module includes a hinge element and a holding element. The hinge element is pivotally connected to the hinge portion and connected to the holding element. The holding element and the docking body form a groove. The holding element for holding the electronic apparatus is rotatable relative to the docking body for more than 270 degrees through the rotation space provided by the groove until being stopped by the docking body.

In one embodiment, the operation interface includes at least a key, or at least a touch pad, or their combinations.

In one embodiment, the docking body includes a plurality of connection ports.

In one embodiment, the largest rotation angle of the holding element relative to the docking body is 295 degrees.

In one embodiment, the docking station further comprises a gravity sensing device disposed to the docking body. When the docking body is turned over, the gravity sensing device is triggered to output a shut-off signal for shutting off the function of the operation interface.

In one embodiment, the docking station further comprises a sensing device disposed at a side wall of the docking body. When the holding element is rotated relative to the docking body for 295 degrees, the holding element automatically triggers the sensing device so that the docking station shuts off the function of the operation interface.

In one embodiment, the docking station further comprises a manual switch disposed on the operation interface. When the manual switch is triggered, the function of the operation interface is shut off.

In one embodiment, the docking station further comprises an electrical connector disposed to the holding element. When the holding element holds the electronic apparatus, the electronic apparatus is electrically connected to the electrical connector.

In one embodiment, the docking station further comprises a wireless transceiver module disposed to the docking body and electrically connected to the operation interface.

In one embodiment, the wireless transceiver module includes a Bluetooth wireless transceiver module.

As mentioned above, the docking station of the disclosure includes a docking body and a hinge module, and a hinge element of the hinge module is connected to a hinge portion of the docking body and connected to a holding element of the hinge module. Besides, a groove is formed between the holding element and the docking body. Thereby, the holding element for holding an electronic apparatus can be rotated relative to the docking body for more than 270 degrees through the rotation space provided by the groove until being stopped by the docking body. Hence, the docking station of the disclosure can have more applications. When the electronic apparatus is disposed to the holding element of the docking station, the docking station can be regarded as the base of the electronic apparatus so as to improve the operational stability of the electronic apparatus. Furthermore, the more space for operating the electronic apparatus can be provided because the docking station is hidden behind.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
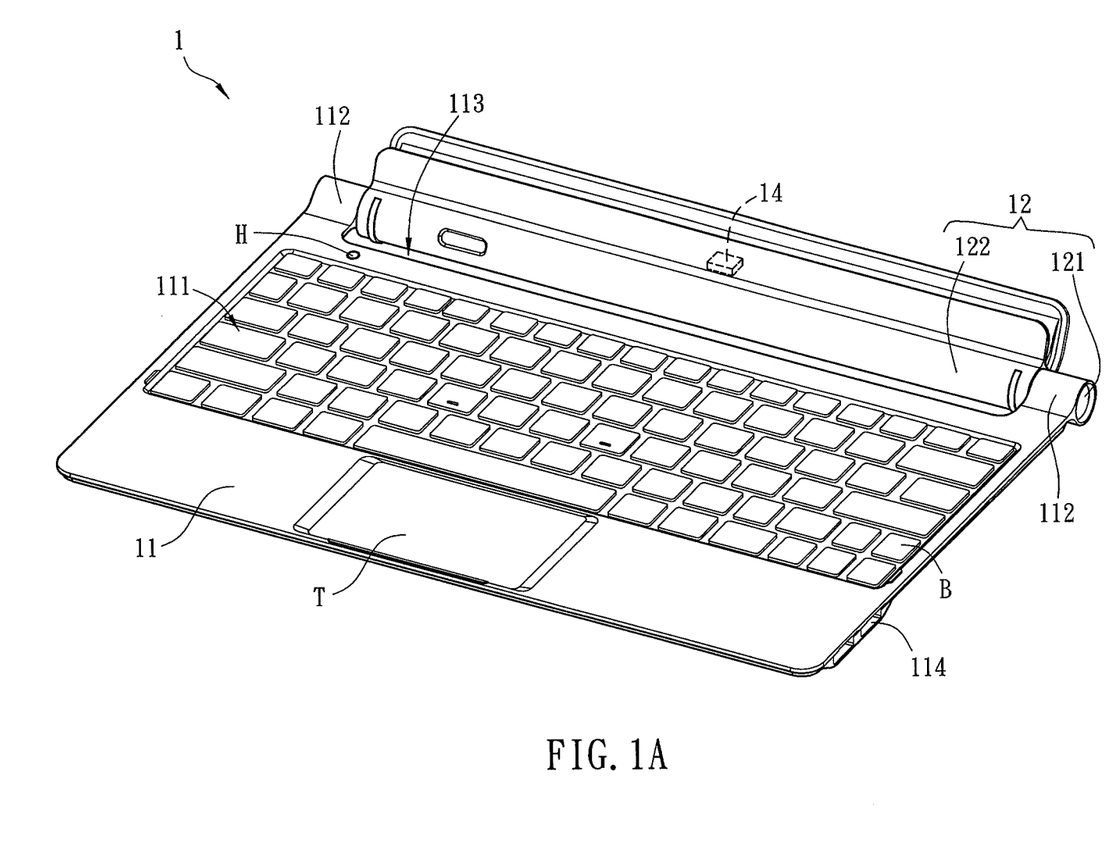
FIG. 1A is a perspective view of a docking station according to a preferred embodiment of the disclosure.
Figure 1B:
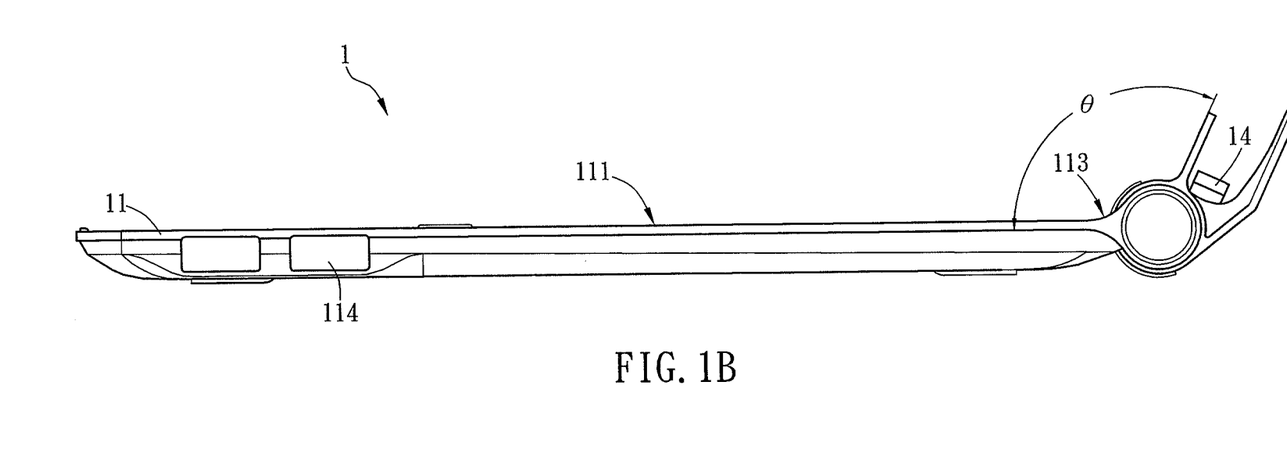
FIG. 1B is a side-view of the docking station according to the preferred embodiment of the disclosure.

FIG. 1A is a schematic diagram of a docking station 1 of a preferred embodiment of the disclosure, and FIG. 1B is a side-view diagram of the docking station 1 as shown in FIG. 1A. The docking station 1 is used to hold an electronic apparatus.

Referring to FIGS. 1A and 1B, the docking station 1 includes a docking body 11 and a hinge module 12.

The docking body 11 includes an operation interface 111, which can include at least a key or at least a touch pad, or their combinations. The key can be a physical key or a virtual key. In this embodiment, the operation interface 111 has a plurality of keys B and a touch pad T, for example. The docking body 11 further includes a hinge portion 112. Herein, the hinge portion 112 is located at two sides of the docking body 11. Besides, the docking body 11 can include a plurality of connection ports 114 for connecting other devices. The docking body 11 can further include a power connection hole (not shown) and a rechargeable cell (not shown). The city power can be used to activate the docking station 1 through the power connection hole, or the rechargeable cell can be charged through the power connection hole.

The hinge module 12 includes a hinge element 121 and a holding element 122. The hinge portion 112 of the docking body 11 and the hinge element 121 are connected together, and the holding element 122 is connected to the hinge element 121. Herein, the hinge element 121 passes through the holding element 122. The hinge element 121 and the hinge portion 112 can be integrally formed as one piece, or the hinge element 121 and the holding element 122 can be integrally formed as one piece. If the hinge element 121 and the hinge portion 112 are integrally formed as one piece, the holding element 122 is rotatable relative to the hinge element 121. If the hinge element 121 and the holding element 122 are integrally formed as one piece, the hinge element 121 is rotatable relative to the hinge portion 112. Herein, the hinge element 121 and the hinge portion 112 are integrally formed as one piece so that the holding element 122 is rotatable relative to the hinge element 121. In addition, as shown in FIG. 1A, the holding element 122 and the docking body 11 form a groove 113, and the holding element 122 can rotate relative to the docking body 11 through the groove 113.

Figure 1C:
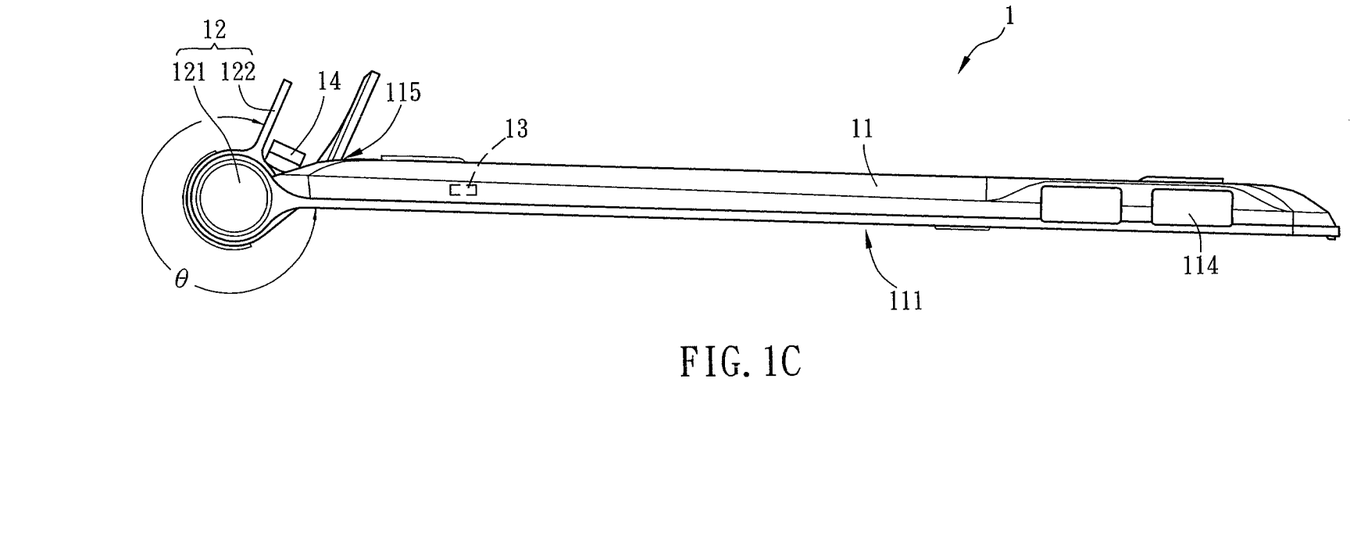
FIG. 1C is another side-view of the docking station according to the preferred embodiment of the disclosure.
Figure 1D:
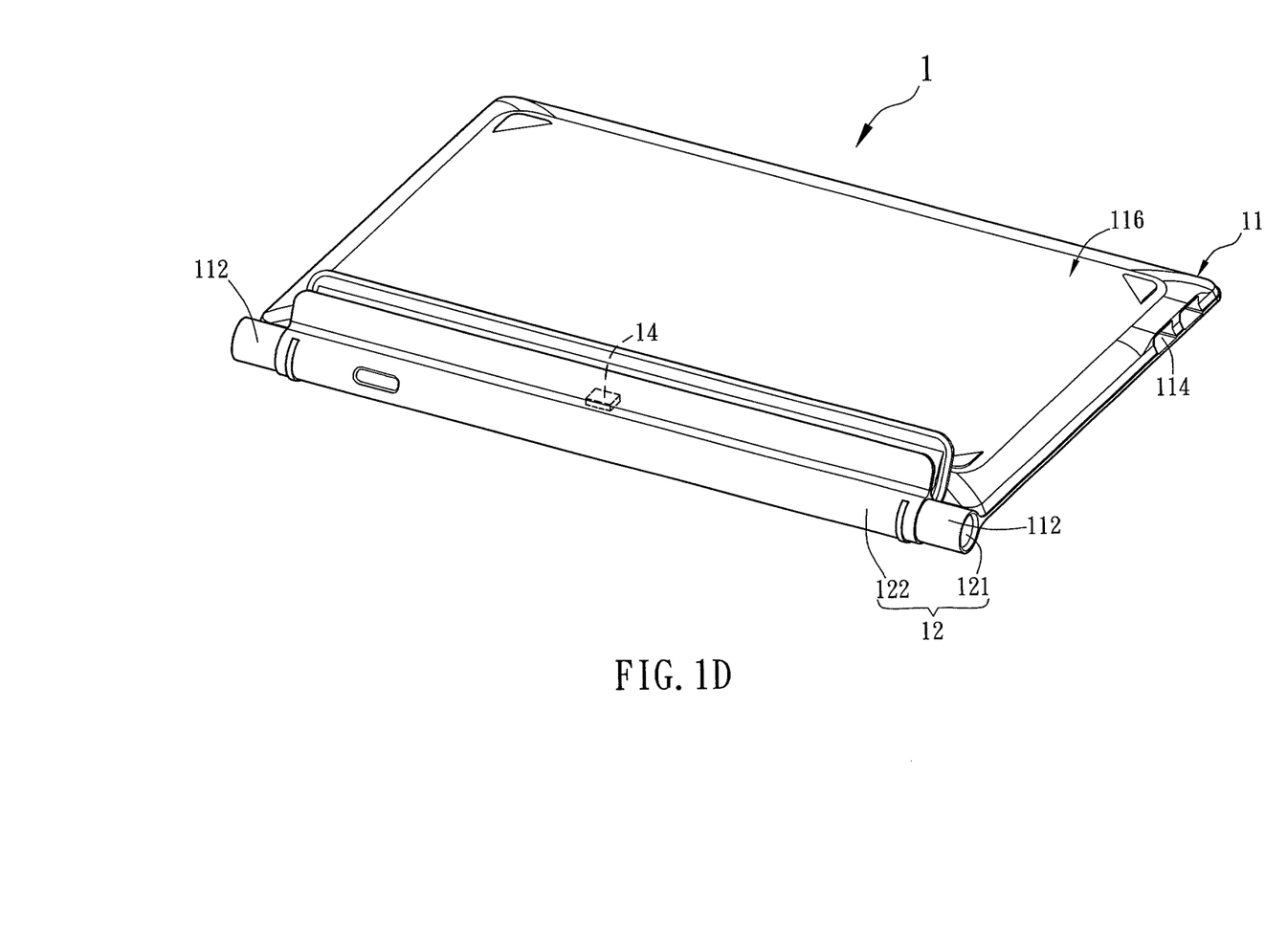
FIG. 1D is another perspective view of the docking station according to the preferred embodiment of the disclosure.

FIG. 1C is another side-view of the docking station 1, and FIG. 1D is another schematic diagram of the docking station 1.

As shown in FIGS. 1A and 1C, through the rotation space provided by the groove 113, the holding element 122 can rotate relative to the docking body 11. The groove 113 can insure that no interference occurs with the rotation of the holding element 122 of the hinge module 12, and besides, the holding element 122 can rotate relative to the docking body 11 for a rotation angle θ more than 270 degrees until being stopped by the docking body 11. Herein, the holding element 122 is stopped by a side wall 115 of the docking body 11. In other words, the holding element 122 can rotate relative to the docking body 11, the rotation angle θ is zero when the holding element 122 covers the docking body 11, and when the rotation angle θ of the holding element 122 exceeds 180 degrees, the holding element 122 is rotated to the opposite side of the operation interface 111 of the docking body 11 (i.e. the backside of the docking body 11).

For example, as shown in FIG. 1C, the rotation angle θ of the holding element 122 relative to the docking body 11 is 120 degrees. Besides, FIG. 1D shows the largest rotation angle θ of the holding element 122 relative to the docking body 11 is 295 degrees. Accordingly, the rotation angle θ of the holding element 122 relative to the docking body 11 is from zero to 295 degrees. As shown in FIGS. 1C and 1D, when the rotation angle θ reaches 295 degrees, the holding element 122 is stopped by the side wall 115 of the docking body 11 (i.e. an edge of the opposite side of the operation interface 111 of the docking body 11). To be noted, when the holding element 122 is rotated to the backside of the docking body 11 (the opposite side of the operation interface 111), the docking body 11 can be regarded as a base so as to be disposed on a tabletop. Besides, if the docking station 1 is regarded as a base and disposed reversely (i.e. the operation interface 111 is upwards while the holding element 122 is downwards), the holding element 122 can function as a foot stand to set the docking station 1 up higher. In other embodiments, the docking station 1 can be capable of wireless transmission, or can function as an independent wireless remote control device to control household digital electronic apparatuses.

Nevertheless, because the operation interface 111 of the docking body 11 has keys B, the erroneous trigger will occur if the key B is touched by the tabletop when the docking body 11 is regarded as a base and thus disposed on the tabletop. To prevent this event, as shown in FIG. 1C, the docking station 1 can further include a gravity sensing device 13, which is disposed inside the docking body 11. When the docking body 11 is turned over so that the operation interface 111 is downwards, the gravity sensing device 13 can be triggered to output a shut-off signal to the docking body 11 for shutting off the function of the operation interface 111. Therefore, even if the key B is touched, the erroneous trigger by the key B can be prevented. The gravity sensing device can be a G sensor, such as a gyroscope.

Otherwise, the docking station 1 can include a sensing device (not shown), which can be disposed at the side wall 115 of the docking body 11. When the rotation angle θ of the holding element 122 relative to the docking body 11 reaches 295 degrees (the largest rotation angle), the holding element 122 will contact and trigger the sensing device disposed on the side wall 115 so that the docking station 1 shuts off the function of the operation interface 111. Therefore, even if the key B is touched, the erroneous trigger by the key B can be prevented. The sensing device can include an electronic sensing device, a touch sensing device, an infrared sensing device, an ultrasonic sensing device, a stress sensing device, a microswitch device, or their combinations. Besides, the gravity sensing device and the sensing device also can be used together.

As shown in FIG. 1A, the docking station 1 can include a manual switch (such as a key) H, which is disposed on the operation interface 111. Before the user rotates the holding element 122 to the backside of the docking body 11, the user can push the manual switch H to shut off the function of the keys B of the operation interface 111 for preventing the erroneous triggers caused by the keys B.

Besides, the docking station 1 can include an electrical connector 14, which is disposed in the holding element 122 and electrically connected to the docking body 11. Accordingly, when the holding element 122 is rotated, the electrical connector 14 also rotates with the holding element 122. No matter how the holding element 122 rotates, the electrical connector 14 maintains the electrical connection with the docking body 11.

Figure 2A:
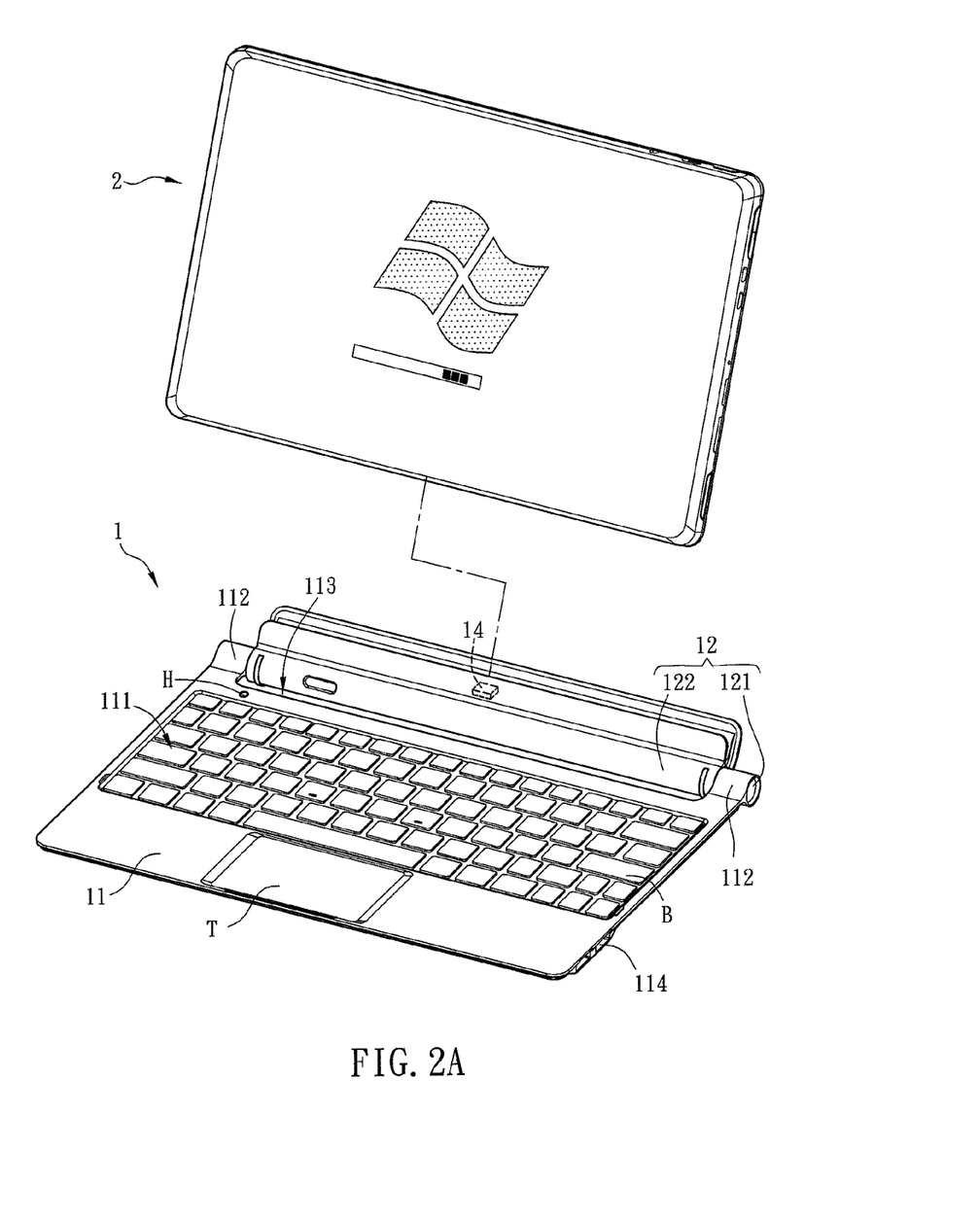
FIGS. 2A and 2B are schematic diagrams of the assembly of the docking station of the disclosure, and an electronic apparatus.
Figure 2B:
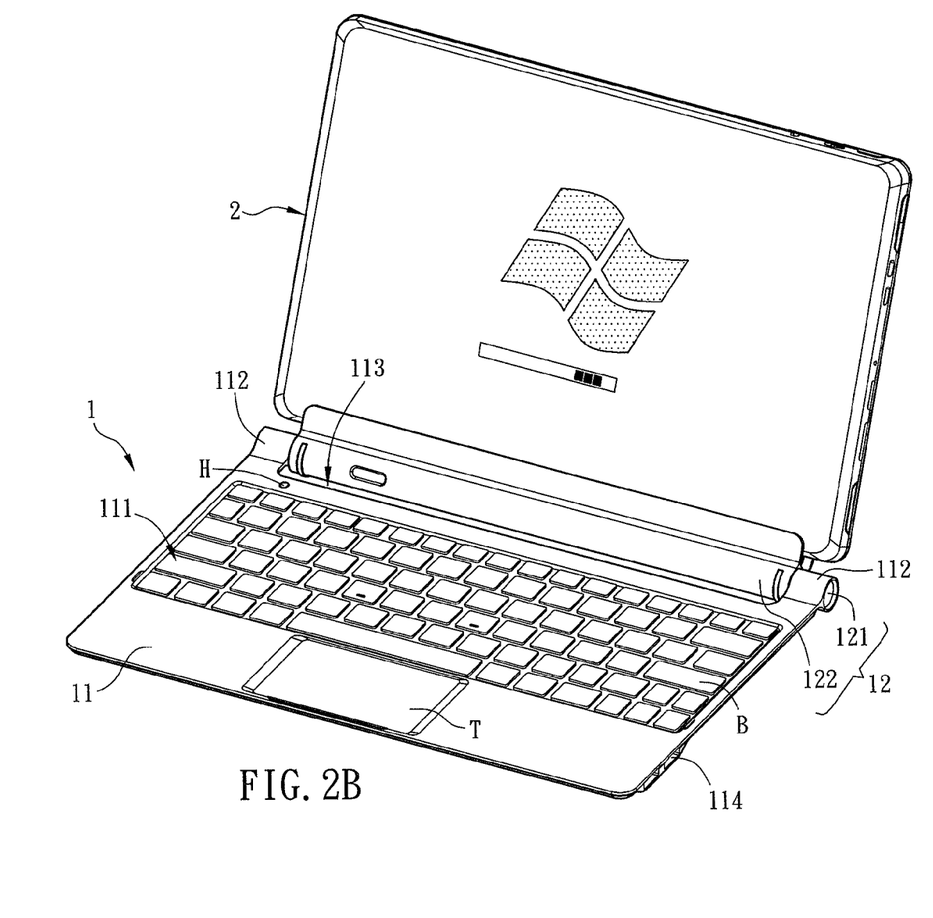

FIGS. 2A and 2B are schematic diagrams of the assembly of the docking station 1 of the disclosure, and an electronic apparatus 2.

Referring to FIGS. 2A and 2B, the docking station 1 can be cooperated with the electronic apparatus 2, and the electronic apparatus 2 can be electrically coupled with the docking station 1. Herein, the electrical coupling includes the physical or non-physical electrical connection. The physical electrical connection means that the electronic apparatus 2 is inserted into the electrical connector 14 disposed in the holding element 122. The non-physical electrical connection means the connection through a wireless transmission for example. In the case of the non-physical electrical connection, both of the docking body 11 and the electronic apparatus 2 can have wireless transmission function. Accordingly, the docking station 1 can further include a wireless transceiver module (not shown), which is disposed in the docking body 11 and electrically connected to the operation interface 111. In other words, the signal generated by the operation interface 111 can be transmitted through the wireless transceiver module to control the electronic apparatus 2. The wireless transceiver module can be, for example, a Bluetooth wireless transceiver module. Therefore, the docking station 1 of the disclosure also can function as an independent wireless remote control device to control household digital electronic apparatuses.

In this embodiment, the electronic apparatus 2 is directly inserted to the holding element 122, and then electrically connected to the docking station 1 through the electrical connector 14. Accordingly, with the holding element 122, the electronic apparatus 2 can be rotated relative to the docking body 11 for more than 270 degrees through the rotation space provided by the groove 113, and then stopped by the docking body 11.

As shown in FIG. 2B, when the electronic apparatus 2 (with the holding element 122) is rotated relative to the docking body 11 for about 120 degrees, the docking station 1 can function as a keyboard of the electronic apparatus 2, like a conventional notebook computer.

Figure 2C:
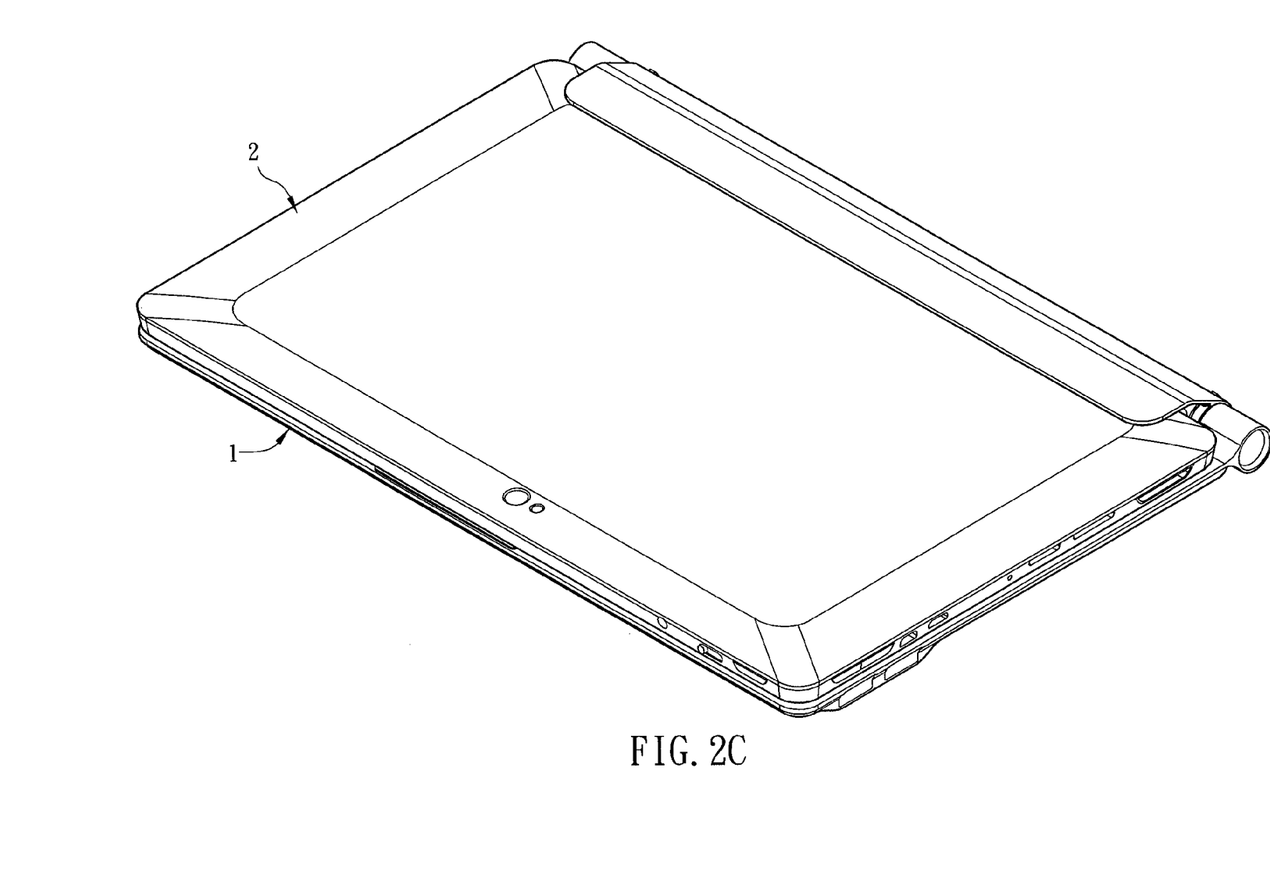
FIGS. 2C and 2D are schematic diagrams of the docking station of the disclosure and the electronic apparatus at a folding state and an operational state, respectively.

As shown in FIG. 2C, for the fold, the electronic apparatus 2 can be rotated to cover the docking station 1 (the rotation angle θ is zero at this moment), and thus the docking station 1 and the electronic apparatus 2 can be stored in a way the same as a conventional notebook computer.

Figure 2D:
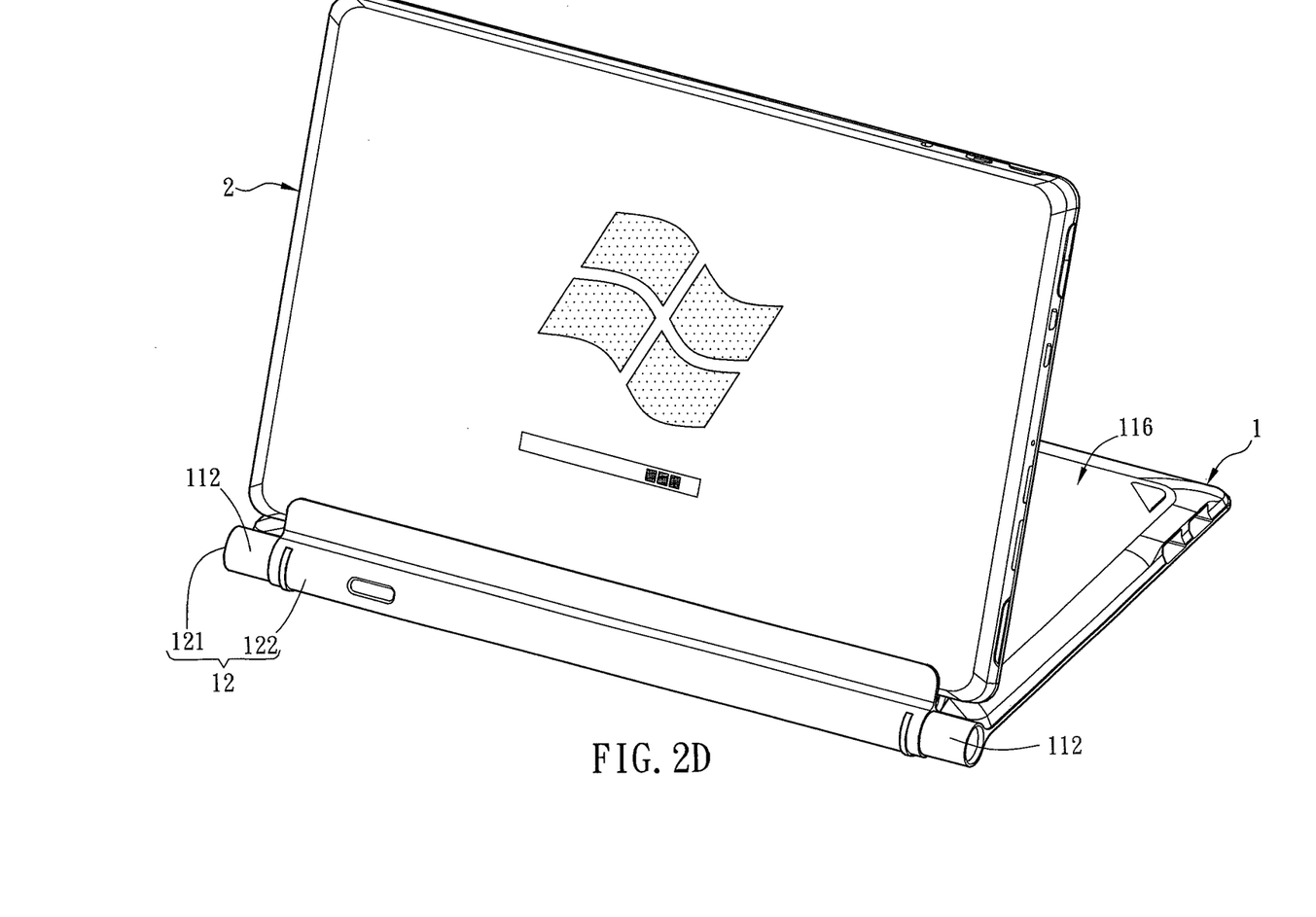

Besides, as shown in FIG. 2D, when the electronic apparatus 2 is a touch tablet computer, the electronic apparatus 2 can be rotated relative to the docking body 11 for the largest rotation angle of 295 degrees so that the docking body 11 can be regarded as the base of the electronic apparatus 2. In the meantime, the function of the keys B on the operation interface 111 of the docking station 1 is shut off by the method as mentioned above so that the keys B will not be triggered erroneously. Accordingly, not only the operational stability of the electronic apparatus 2 is enhanced, but also the more space for operating the electronic apparatus 2 can be provided because the docking station 1 is hidden behind. Furthermore, when the docking station 1 is disposed on the tabletop by being regarded as the base of the electronic apparatus 2, the hinge module 12 contacts the tabletop so the whole structure is more stable. Thereby, the docking station 1 can be prevented from being raised and apart from the tabletop.

In summary, the docking station of the disclosure includes a docking body and a hinge module, and a hinge element of the hinge module is pivotally connected to a hinge portion of the docking body and connected to a holding element of the hinge module. Besides, a groove is formed between the holding element and the docking body. Thereby, the holding element for holding an electronic apparatus can be rotated relative to the docking body for more than 270 degrees through the rotation space provided by the groove until being stopped by the docking body. Hence, the docking station of the disclosure can have more applications. When the electronic apparatus is disposed to the holding element of the docking station, the docking station can be regarded as the base of the electronic apparatus so as to improve the operational stability of the electronic apparatus. Furthermore, the more space for operating the electronic apparatus can be provided because the docking station is hidden behind.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A docking station for holding an electronic apparatus, comprising:
    a docking body comprising an operation interface and a hinge portion;
    a hinge module comprising a hinge element and a holding element, wherein the hinge element is pivotally connected to the hinge portion and connected to the holding element, the holding element and the docking body form a groove, the holding element for holding the electronic apparatus is rotatable relative to the docking body for more than 270 degrees through the rotation space provided by the groove until being stopped by the docking body; and
    a sensing device disposed at a side wall of the docking body, wherein when the holding element is rotated relative to the docking body for 295 degrees, the holding element contacts and triggers the sensing device so that the docking station shuts off the function of the operation interface.

2. The docking station as recited in claim 1, wherein the operation interface comprises at least a key, or at least a touch pad, or their combinations.

3. The docking station as recited in claim 1, wherein the docking body comprises a plurality of connection ports.

4. The docking station as recited in claim 1, wherein the largest rotation angle of the holding element relative to the docking body is 295 degrees.

5. The docking station as recited in claim 1, further comprising:
    a gravity sensing device disposed to the docking body, wherein when the docking body is turned over, the gravity sensing device is triggered to output a shut-off signal for shutting off the function of the operation interface.

6. The docking station as recited in claim 1, further comprising:
    a manual switch disposed on the operation interface, wherein when the manual switch is triggered, the function of the operation interface is shut off.

7. The docking station as recited in claim 1, further comprising:
    an electrical connector disposed to the holding element, wherein when the holding element holds the electronic apparatus, the electronic apparatus is electrically connected to the electrical connector.

8. The docking station as recited in claim 1, further comprising:
    a wireless transceiver module disposed to the docking body and electrically connected to the operation interface.

9. The docking station as recited in claim 8, wherein the wireless transceiver module comprises a Bluetooth wireless transceiver module.

* * * * *